(12) United States Patent
Yamazaki et al.

(10) Patent No.: US 11,960,010 B2
(45) Date of Patent: Apr. 16, 2024

(54) POSITIONING METHOD AND POSITIONING TERMINAL

(71) Applicants: Panasonic Intellectual Property Management Co., Ltd., Osaka (JP); NIPPON TELEGRAPH AND TELEPHONE CORPORATION, Tokyo (JP)

(72) Inventors: Yasuhisa Yamazaki, Kanagawa (JP); Suguru Oguchi, Ibaraki (JP); Yoshihiro Iriyama, Ibaraki (JP); Mamoru Kanayama, Ibaraki (JP)

(73) Assignees: PANASONIC INTELLECTUAL PROPERTY MANAGEMENT CO., LTD., Osaka (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 749 days.

(21) Appl. No.: 17/252,045

(22) PCT Filed: Jun. 13, 2019

(86) PCT No.: PCT/JP2019/023577
§ 371 (c)(1),
(2) Date: Jun. 24, 2021

(87) PCT Pub. No.: WO2019/240240
PCT Pub. Date: Dec. 19, 2019

(65) Prior Publication Data
US 2021/0325543 A1   Oct. 21, 2021

(30) Foreign Application Priority Data
Jun. 15, 2018   (JP) .................................. 2018-114775

(51) Int. Cl.
*G01S 19/11* (2010.01)
*G01S 19/25* (2010.01)
(Continued)

(52) U.S. Cl.
CPC ............. *G01S 19/11* (2013.01); *G01S 19/252* (2013.01); *G01S 19/28* (2013.01); *G01S 19/30* (2013.01); *G01S 19/43* (2013.01)

(58) Field of Classification Search
CPC ........ G01S 19/11; G01S 19/252; G01S 19/28; G01S 19/30
(Continued)

(56) References Cited

U.S. PATENT DOCUMENTS

2006/0293852 A1    12/2006   Tsurumi
2011/0057833 A1*   3/2011    France ................... G01S 19/426
                                                         342/357.25
(Continued)

FOREIGN PATENT DOCUMENTS

EP      4155780 A1 *   3/2023
JP      2006-242911    9/2006
WO      2006/132003    12/2006

OTHER PUBLICATIONS

Extended European Search Report from European Patent Office (EPO) in European Patent Appl. No. 19819438.3, dated Jul. 30, 2021.
(Continued)

*Primary Examiner* — Harry K Liu
(74) *Attorney, Agent, or Firm* — Greenblum & Bernstein, P.L.C.

(57) ABSTRACT

A positioning terminal is provided and identifies, as appropriate, a satellite to be excluded, thereby improving positioning accuracy. A processor acquires a signal-to-noise ratio (SNR) and an angle of elevation for each satellite. The
(Continued)

processor next identifies a satellite for which the SNR is less than a shielding SNR mask as a multipath satellite and selects the satellite to be excluded. The processor next generates positioning terminal positioning data using a positioning signal from satellites other than the satellite to be excluded. The processor next uses reference station positioning data and positioning terminal positioning data of the selected satellite to execute an RTK calculation.

14 Claims, 11 Drawing Sheets

(51) Int. Cl.
*G01S 19/28* (2010.01)
*G01S 19/30* (2010.01)
*G01S 19/43* (2010.01)

(58) Field of Classification Search
USPC .......................................................... 342/352
See application file for complete search history.

(56) References Cited

U.S. PATENT DOCUMENTS

2015/0063078 A1 3/2015 Matsuzaki
2018/0217265 A1* 8/2018 Pieroni .................. H04B 7/269
2018/0284291 A1* 10/2018 Marmet .................. G01S 19/11

OTHER PUBLICATIONS

International Search Report (ISR) from International Searching Authority (Japan Patent Office) in International Pat. Appl. No. PCT/JP2019/023577, dated Sep. 17, 2019, together with an English language translation thereof.

* cited by examiner

POSITIONING METHOD AND POSITIONING TERMINAL

TECHNICAL FIELD

The present invention relates to a positioning method and a positioning terminal in a case where interference positioning is performed by utilizing a signal from a positioning satellite (hereinafter, artificial satellites that can be used for positioning are generally referred to as "satellite").

BACKGROUND ART

In the related art, interference positioning by a real time kinematic (RTK) method (RTK calculation) has been utilized in order to measure an object in a stationary state with high accuracy. The RTK method uses a carrier wave phase integrated value of a positioning signal transmitted by a satellite to perform positioning at a predetermined point. It is expected that high accurate positioning of a moving body is realized by applying the interference positioning by the RTK method to positioning of the moving body.

A positioning terminal attached to a moving body such as a vehicle receives a positioning signal from a satellite (not illustrated) of a global navigation satellite system (GNSS) when an RTK calculation is performed. Note that, GNSS is a generic term for satellite navigation systems with performance (accuracy and reliability) that can be used for civil aviation navigation such as global positioning system (GPS), BeiDou, and GLONASS. The positioning signal includes an L1 signal (1575.42 MHz), an L2 signal (1227.60 MHz), and the like transmitted from a GPS satellite.

In a shielded environment, a composite wave of a direct wave from a satellite and a multipath wave, or only a multipath wave may be input to an antenna of a positioning terminal. When a positioning terminal is strongly affected by a multipath, the positioning terminal is incapable of distinguishing between a direct wave and a multipath wave, and highly possibly makes a mistake in interference positioning, which adversely affects convergence time and positioning stability in RTK calculation and leads to deterioration of positioning accuracy. Note that, in interference positioning, a difference between distances to a satellite is calculated by using phases, and positioning is performed by using the calculated difference in distance. Accordingly, when a phase of a multipath wave is used, a resulting distance becomes longer than the original distance by a distance required for the multipath wave to be reflected by a building or the like and to reach a positioning terminal, and an error is also likely to occur in a result of positioning using the distance longer than the original distance.

In the related art, a technique is disclosed in which a positioning terminal distinguishes and excludes a satellite that is highly likely to receive at least a certain degree of multipath waves (hereinafter, the satellite will be referred to as "multipath satellite") from satellites based on a signal strength (SNR), and performs an RTK calculation by using positioning signals from the remaining satellites, thereby improving positioning accuracy. In Patent Literature (hereinafter, referred to as "PTL") 1, a satellite is excluded in which a difference between a theoretical signal strength depending on an elevation angle and a signal strength acquired by a receiver exceeds a predetermined threshold (SNR mask).

CITATION LIST

Patent Literature

PTL 1
WO 2006/132003

SUMMARY OF INVENTION

Technical Problem

A signal transmitted from a satellite with a low elevation angle (for example, an elevation angle of 25° or less) is attenuated and scattered due to an effect of an atmosphere through which the signal passes, and therefore has a low SNR even when the signal is a direct wave. Further, an amount of variation in SNR when the positioning terminal receives at least a certain degree of multipath waves is large. Accordingly, in a signal from a satellite with a low elevation angle, the SNR in a case where only a direct wave is received may be not significantly different from the SNR in a case where a multipath wave is received. Thus, since a signal from a satellite with a low elevation angle behaves such that the value of the SNR is difficult to predict, the method of PTL 1 has difficulty in correctly identifying a satellite to be excluded, and the effect of improving positioning accuracy is reduced therein.

Non-limiting and exemplary embodiments of the present disclosure disclose a positioning method and a positioning terminal capable of more appropriately identifying a satellite to be excluded and improving positioning accuracy.

Solution to Problem

A positioning method according to an aspect of the present disclosure is a positioning method of determining coordinates of a moving body by performing a positioning calculation by a positioning terminal based on information transmitted from a plurality of satellites, the positioning method including: calculating, by the positioning terminal, an elevation angle of each of the satellites; measuring, by the positioning terminal, a received strength of a signal transmitted from each of the satellites; comparing, by the positioning terminal, the received strength with a first threshold for each of the satellites, the first threshold being a threshold whose value becomes higher as the elevation angle becomes lower; selecting, by the positioning terminal, a satellite for which the received strength is less than the first threshold, as an exclusion target; and performing, by the positioning terminal, the positioning calculation based on information transmitted from a satellite other than the satellite selected as the exclusion target.

A positioning terminal according to an aspect of the present disclosure includes: a receiver that receives positioning signals transmitted from a plurality of satellites; and a processor that determines coordinates of a moving body by performing a positioning calculation based on information included in the positioning signals, wherein the processor calculates an elevation angle of each of the satellites; measures a received strength of a signal transmitted from each of the satellites; compares the received strength with a first threshold for each of the satellites, the first threshold being a threshold whose value becomes higher as the elevation angle becomes lower; selects a satellite for which the received strength is less than the first threshold, as an exclusion target; and performs the positioning calculation based on information transmitted from a satellite other than the satellite selected as the exclusion target.

It should be noted that general or specific embodiments may be implemented as a system, a method, an integrated circuit, a computer program, a storage medium, or any selective combination thereof.

Advantageous Effects of Invention

According to an aspect of the present disclosure, it is possible to more appropriately identify a satellite to be excluded and improve positioning accuracy.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present invention will be described in detail with reference to the drawings as appropriate. However, a detailed description more than necessary may be omitted, such as a detailed description of an already well-known matter and a duplicate description for a substantially identical configuration, to avoid unnecessary redundancy of the following description and to facilitate understanding by the person skilled in the art.

Note that, the accompanying drawings and the following description are provided for the person skilled in the art to sufficiently understand the present disclosure, and are not intended to limit the subject matter described in the claims.

Embodiment 1

<Configuration of Positioning System>

Figure 1:
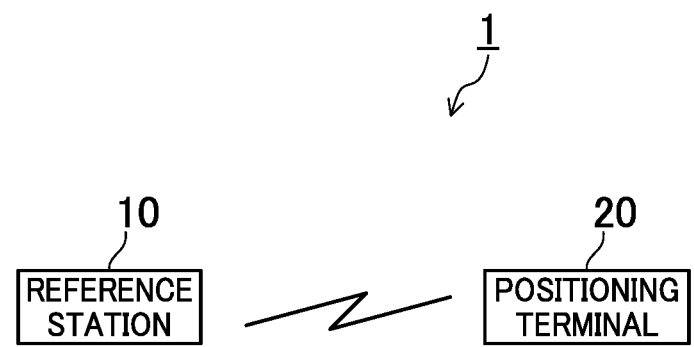
FIG. 1 is a diagram illustrating a configuration of a positioning system according to Embodiment 1 of the present disclosure.

First, a configuration of positioning system 1 according to Embodiment 1 will be described with reference to FIG. 1. As illustrated in FIG. 1, positioning system 1 is formed by reference station 10 and positioning terminal 20. Reference station 10 is installed at a location where the coordinates on the earth are known. Positioning terminal 20 is installed in a moving body (for example, a vehicle) for which the coordinates are to be determined.

Positioning system 1 measures a position of positioning terminal 20 and determines coordinates of positioning terminal 20 on the earth. The coordinates are generally three-dimensional coordinates of latitude, longitude, and altitude, for example, but may be two-dimensional coordinates such as latitude and longitude.

Reference station 10 generates positioning data of reference station 10 (hereinafter, referred to as "reference station positioning data") based on a positioning signal received from a GNSS satellite, and transmits the reference station positioning data to positioning terminal 20. Note that, details of the positioning data will be described later.

Positioning terminal 20 generates positioning data of positioning terminal 20 (hereinafter, referred to as "positioning terminal positioning data") based on a positioning signal received from a GNSS satellite, performs interference positioning processing by an RTK method for each epoch by using reference station positioning data and positioning terminal positioning data, and outputs coordinates of a moving body. The epoch refers to data acquisition time, and an epoch interval refers to a time unit representing a time interval (cycle) of the data acquisition time. For example, in a case where positioning terminal 20 operates at 5 Hz, five pieces of data are acquired per second, and the epoch interval is therefore 0.2 seconds. Note that, positioning terminal 20 includes a dedicated terminal for positioning, a personal computer having a positioning function, a smartphone, a tablet, a server that performs a positioning service, and the like.

<Configuration of Reference Station>

Figure 2:
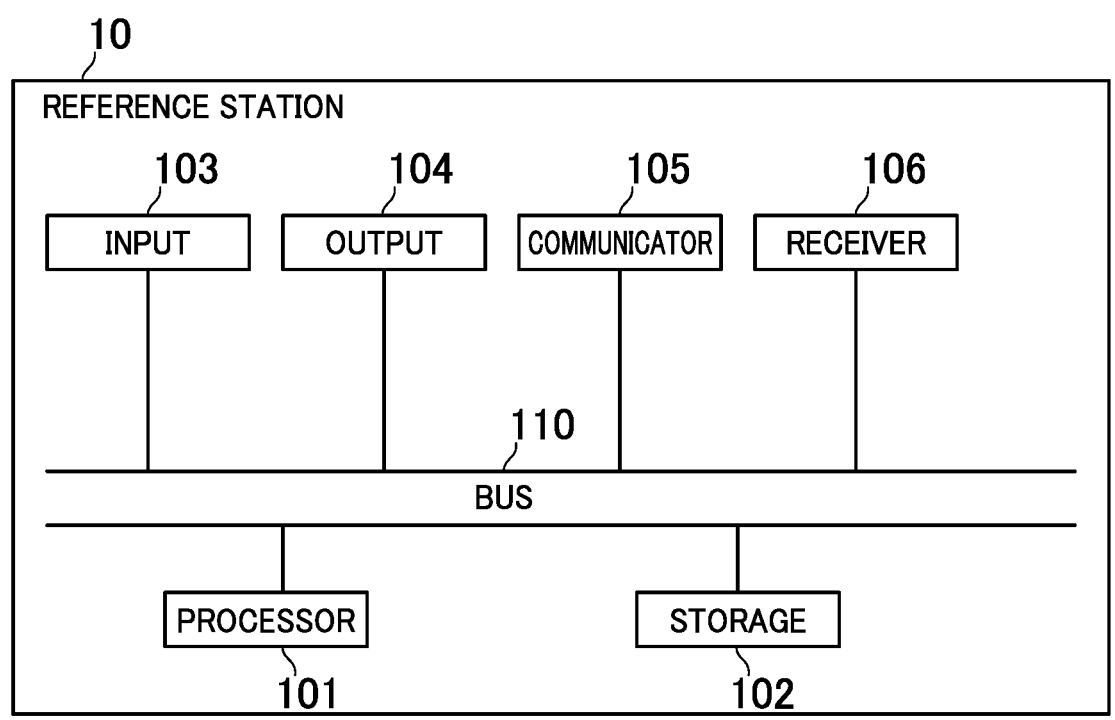
FIG. 2 is a block diagram illustrating a configuration of a reference station according to Embodiment 1 of the present disclosure.

Next, a configuration of reference station 10 according to Embodiment 1 will be described with reference to FIG. 2. As illustrated in FIG. 2, reference station 10 includes processor 101, storage 102, input 103, output 104, communicator 105, receiver 106, and bus 110.

Processor 101 controls other elements of reference station 10 via bus 110. As processor 101, a general-purpose central processing unit (CPU) is used, for example. Further, processor 101 generates reference station positioning data based on a positioning signal by executing a predetermined program.

Storage 102 acquires various information from other elements, and temporarily or permanently retains the information. Storage 102 is a generic term for so-called primary storage apparatuses and secondary storage apparatuses. A plurality of storages 102 may be physically disposed. As storage 102, a direct random access memory (DRAM), a hard disk drive (HDD), or a solid state drive (SSD) is used, for example.

Input 103 receives information from the outside. The information received by input 103 from the outside includes information on an input from an operator of reference station 10, and the like. As an example, input 103 can be configured by using an input interface such as a keyboard.

Output 104 presents information to the outside. The information presented by output 104 includes information on positioning, and the like. As an example, output 104 can be configured by using an existing output interface such as a display.

Communicator 105 communicates with an external apparatus via a communication path. The apparatus (communicating target) with which communicator 105 communicates includes positioning terminal 20. As an example, communicator 105 can be configured by using a communication interface capable of communicating with an existing communication network such as a wireless LAN communication network and a 3G communication network.

Receiver 106 receives a positioning signal from a satellite, and outputs a positioning signal to processor 101 via bus 110.

Note that, the configuration of reference station 10 described above is an example. Reference station 10 can also be configured by integrating some of each component of reference station 10. Reference station 10 can also be configured by dividing some of each component of reference station 10 into a plurality of elements. Some of each component of reference station 10 can also be omitted. Reference station 10 can also be configured by adding other elements to reference station 10.

<Configuration of Positioning Terminal>

Figure 3:
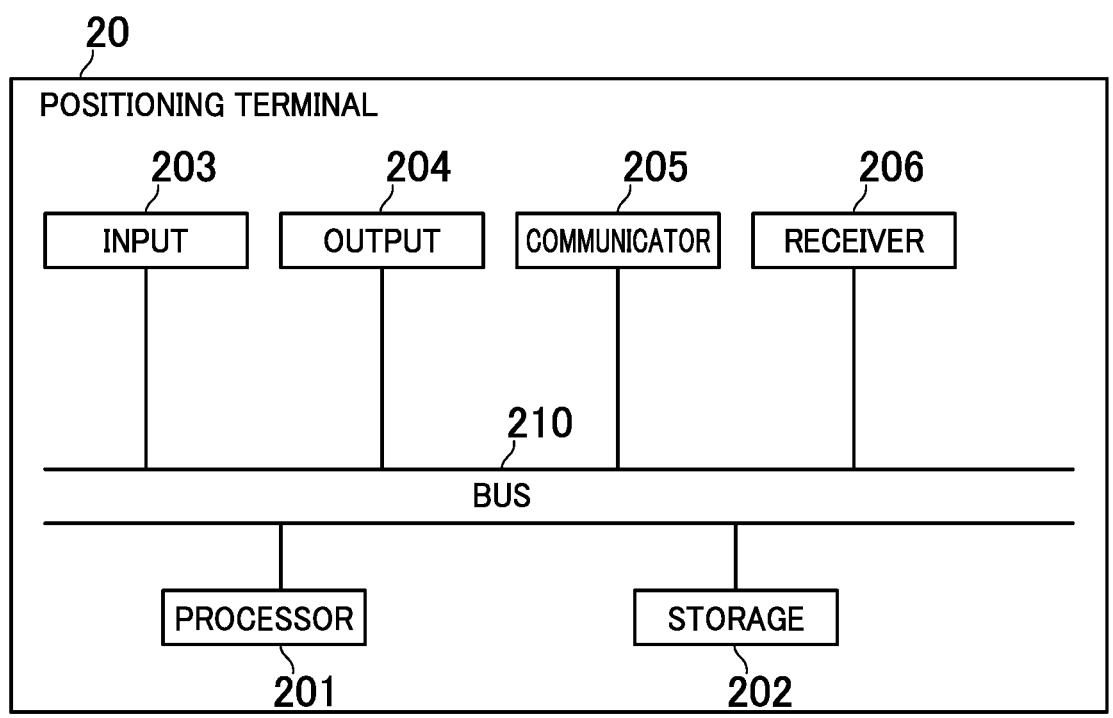
FIG. 3 is a block diagram illustrating a configuration of a positioning terminal according to Embodiment 1 of the present disclosure.

Next, a configuration of positioning terminal 20 according to Embodiment 1 will be described with reference to FIG. 3. As illustrated in FIG. 3, positioning terminal 20 includes processor 201, storage 202, input 203, output 204, communicator 205, receiver 206, and bus 210.

Processor 201 controls other elements of positioning terminal 20 via bus 210. As processor 201, a general-purpose CPU is used, for example. Further, processor 201 generates positioning terminal positioning data based on a positioning signal by executing a predetermined program. Further, in Embodiment 1, processor 201 has a function of outputting coordinates of a moving body. Details of the function of processor 201 mentioned above will be described later.

Storage 202 acquires various information from other elements, and temporarily or permanently retains the information. Storage 202 is a generic term for so-called primary storage apparatuses and secondary storage apparatuses. A plurality of storages 202 may be physically disposed. As storage 202, a DRAM, an HDD, or an SSD is used, for example.

In Embodiment 1, storage 202 stores a shielding SNR mask (first threshold) whose value changes according to an elevation angle.

Input 203 receives information from the outside. The information received by input 203 from the outside includes information on an input from an operator of positioning terminal 20, and the like. As an example, input 203 can be configured by using an input interface such as a keyboard.

Outter 204 presents information to the outside. The information presented by output 204 includes information on positioning, and the like. As an example, output 204 can be configured by using an existing output interface such as a display.

Communicator 205 communicates with an external apparatus via a communication path. The apparatus (communicating target) with which communicator 205 communicates includes reference station 10. As an example, communicator 205 can be configured by using a communication interface capable of communicating with an existing communication network such as a wireless LAN communication network and a 3G communication network.

Receiver 206 receives a positioning signal from a satellite, and outputs a positioning signal to processor 201 via bus 210.

Note that, the configuration of positioning terminal 20 described above is an example. Positioning terminal 20 can also be configured by integrating some of each component of positioning terminal 20. Positioning terminal 20 can also be configured by dividing some of each component of positioning terminal 20 into a plurality of elements. Some of each component of positioning terminal 20 can also be omitted. Positioning terminal 20 can also be configured by adding other elements to positioning terminal 20.

<Moving Body Coordinates Output Function of Processor of Positioning Terminal>

Next, a function of processor 201 of positioning terminal 20 of outputting coordinates of a moving body will be described in detail.

Processor 201 executes interference positioning by an RTK method (RTK calculation) for each epoch based on reference station positioning data and positioning terminal positioning data, and calculates a positioning solution (fixed solution or float solution). Hereinafter, a positioning solution acquired by an RTK calculation is referred to as "RTK positioning solution". Processor 201 performs a quality check by using an ambiguity ratio (AR) value acquired by an RTK calculation, determines that an RTK positioning solution in a case where the AR value is at least a predetermined threshold (for example, 3.0) is a fixed solution, and determines that an RTK positioning solution in a case where the AR value is less than the predetermined threshold (for example, 3.0) is a float solution.

Processor 201 then sets the RTK positioning solution (fixed solution or float solution) as current coordinates of a moving body, and outputs the current coordinates of the moving body to output 204 for each epoch.

<Positioning Data>

Next, positioning data will be described. In Embodiment 1, the positioning data includes pseudo distance information, carrier wave phase information, and Doppler frequency information.

The pseudo distance information is information on a distance between a satellite and the own station (reference station 10 or positioning terminal 20). The processor (processor 101 or processor 201) is capable of calculating a distance between a satellite and the own station by analyzing a positioning signal. Specifically, the processor first determines an arrival time of a positioning signal based on two pieces of information: (1) a difference between a pattern of a code carried by a positioning signal and a pattern of a code generated by the own station, and (2) a signal generation time of a satellite included in a message (NAVDATA) included in a positioning signal and a signal reception time of the own station. The processor then determines a pseudo distance between the satellite and the own station by multiplying the arrival time by the speed of light. This distance includes an error caused by a difference between the clock of the satellite and the clock of the own station, and the like. Usually, pseudo distance information is generated for at least four satellites in order to reduce an error of this type.

The carrier wave phase information is a phase of a positioning signal received by the own station. The positioning signal is a predetermined sine wave. The processor is capable of calculating a phase of a positioning signal by analyzing a received positioning signal.

The Doppler frequency information is information on a relative speed between a satellite and the own station. The processor is capable of generating Doppler frequency information by analyzing a positioning signal.

As described above, positioning data is generated by processor 101 of reference station 10 and processor 201 of positioning terminal 20, respectively.

<RTK Calculation>

Next, the RTK calculation will be described. The RTK calculation is a calculation that executes an RTK method which is one of interference positioning.

In the RTK method, positioning at a predetermined point is performed by using a carrier wave phase integrated value of a positioning signal transmitted by a satellite. The carrier wave phase integrated value is the sum of (1) the number of waves of the positioning signal from the satellite to a predetermined point and (2) the phase. Since the frequency (and wavelength) of the positioning signal is known when the carrier wave phase integrated value is determined, the distance from the satellite to the predetermined point can be determined. The number of waves of the positioning signal is an unknown number and therefore is referred to as integer ambiguity or integer value bias.

What is important when executing the RTK method is to remove noise and estimate (determine) integer ambiguity.

In the RTK method, noise can be removed by calculating a difference referred to as double difference. The double difference is a difference between values acquired by calculating a difference (single difference) between carrier wave phase integrated values of one receiver with respect to two satellites, with respect to each of two receivers (in Embodiment 1, reference station 10 and positioning terminal 20). In Embodiment 1, at least four satellites are used for positioning using the RTK method. Accordingly, the double difference is calculated by the number of combinations of at least four satellites. In this calculation, reference station positioning data and positioning terminal positioning data are used.

In the RTK method, the integer ambiguity can be estimated in various ways. For example, the integer ambiguity can be estimated by executing a procedure of (1) estimation of a float solution by a least-squares method, and (2) verification of a fixed solution based on the float solution.

The estimation of a float solution by a least-squares method is executed by preparing a simultaneous equation by using a combination of double differences generated for each time unit and solving the prepared simultaneous equation by a least-squares method. The simultaneous equation is generated for each epoch. In this calculation, reference station positioning data, positioning terminal positioning data, and known coordinates of reference station 10 are used. A real number estimate of the integer ambiguity determined in this manner is referred to as float solution (estimated solution).

The float solution determined as described above is a real number, whereas the true value of integer ambiguity is an integer. Accordingly, work to round the float solution to an integer value is required. However, a plurality of candidates can be considered for combinations for rounding the float solution. For this reason, it is necessary to verify the correct integer value from the candidates. A solution that is considered to be somewhat certain as an integer bias by the verification is referred to as fixed solution (precise positioning solution). In Embodiment 1, a quality check is performed by using an AR value acquired by an RTK calculation, and the correct integer value is verified based on the result of the quality check. Note that, reference station positioning data is used in order to narrow down candidates for an integer value efficiently.

<Shielding SNR Mask>

Figure 4:
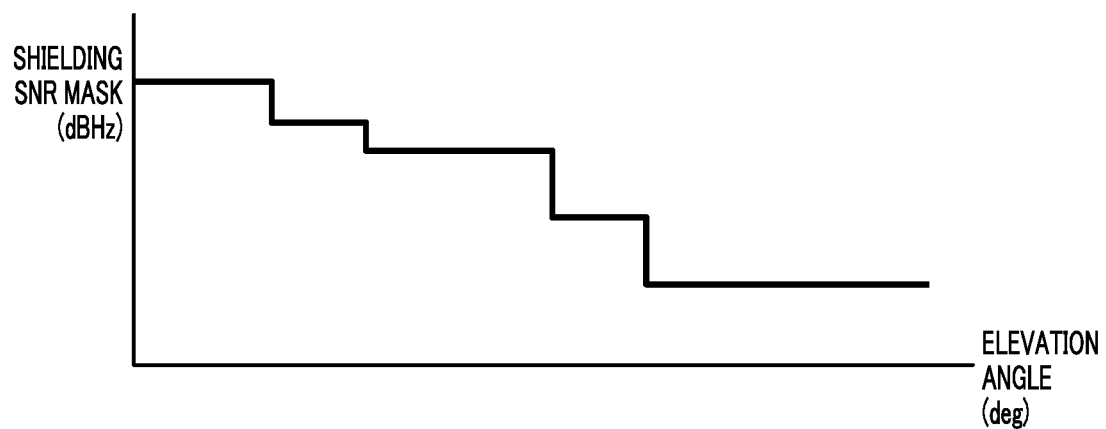
FIG. 4 is a diagram describing a shielding SNR mask according to Embodiment 1 of the present disclosure.

Next, the shielding SNR mask will be described with reference to FIG. 4. Note that, the horizontal axis of FIG. 4 represents the elevation angle (unit: degree), and the vertical axis of FIG. 4 represents the value of the shielding SNR mask (unit: dBHz).

The value of the shielding SNR mask is set to be higher as the elevation angle becomes lower. Note that, the value of the shielding SNR mask may change stepwise or continuously. That is, as illustrated in FIG. 4, it may be configured such that the value of the shielding SNR mask is constant in a predetermined elevation angle range and the shielding SNR becomes discontinuously higher when the elevation angle becomes lower than the elevation angle range, or it may be configured such that the value of the shielding SNR mask becomes continuously higher in a straight or curved shape as the elevation angle becomes lower. That is, the shielding SNR mask may be configured such that at any elevation angle, a value of the SNR mask corresponding to a low elevation angle does not exceed a value of the SNR mask corresponding to a high elevation angle. Note that, when as a whole the value of the shielding SNR mask becomes higher as the elevation angle becomes lower, there may be an elevation angle in which the aforementioned relationship is reversed. In the present specification, these states are comprehensively expressed as "the value of the shielding SNR mask becomes higher as the elevation angle becomes lower".

<Flow of Positioning Processing>

Figure 5:
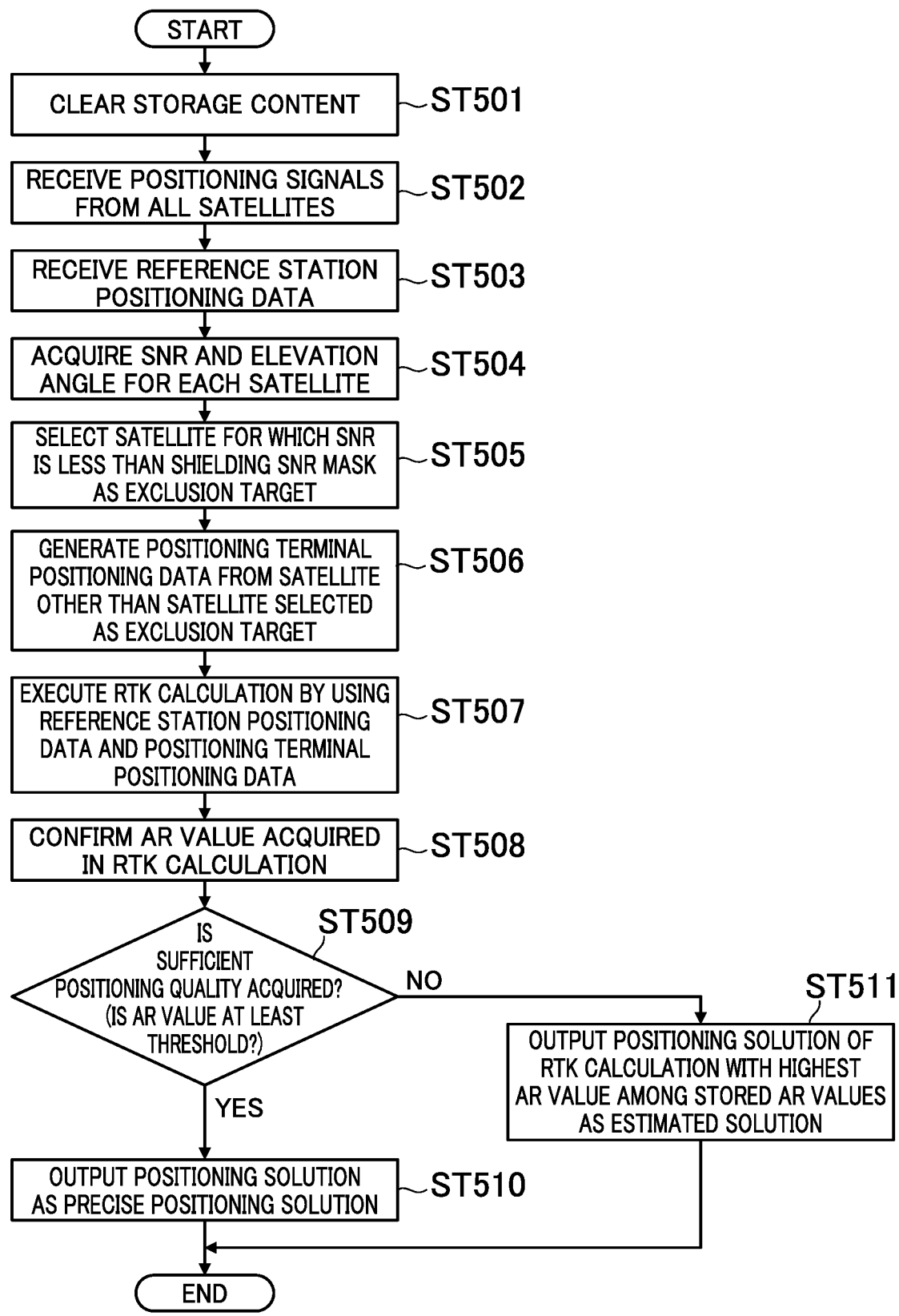
FIG. 5 is a flowchart illustrating positioning processing according to Embodiment 1 of the present disclosure.

Next, a flow of positioning processing according to Embodiment 1 will be described with reference to FIG. 5. Note that, in Embodiment 1, an example in which positioning terminal 20 performs positioning processing will be described. However, the positioning processing according to the present disclosure is not limited to the positioning processing performed by positioning terminal 20, and may be executed by a general-purpose computer added inside positioning system 1, for example. Further, the timing at which the positioning processing is started is not particularly limited. For example, the positioning processing may be started when the power of positioning terminal 20 is turned on. Further, the positioning processing may be started when a command to start the positioning processing is input by input 203 of positioning terminal 20.

First, in ST501, processor 201 clears a storage content of storage 202.

Next, in ST502, receiver 206 receives positioning signals from all receivable satellites, respectively. Further, in ST503, communicator 205 receives reference station positioning data from reference station 10.

Next, in ST504, processor 201 acquires a signal-to-noise ratio (SNR) and an elevation angle for each satellite from the positioning signals received by receiver 206. Note that, since the procedure for acquiring an SNR and an elevation angle is known, a description thereof will be omitted.

Next, in ST505, processor 201 determines a satellite for which the SNR is less than a shielding SNR mask as a multipath satellite, and selects the satellite as an exclusion target.

As described above, the value of the shielding SNR mask is set to become higher as the elevation angle becomes lower. Accordingly, processor 201 is capable of surely excluding a multipath satellite with a low elevation angle by selecting a satellite for which the SNR is less than a shielding SNR mask.

Next, in ST506, processor 201 generates positioning terminal positioning data by using a positioning signal from a satellite other than the satellite selected as the exclusion target.

Next, in ST507, processor 201 executes an RTK calculation by using the reference station positioning data and the positioning terminal positioning data of the selected satellite.

Next, in ST508, processor 201 confirms an AR value acquired in the RTK calculation in ST507.

Then, in ST509, processor 201 confirms the AR value to performs a quality check as to whether or not a sufficient positioning quality is acquired.

In a case where the AR value is at least a threshold (for example, 3.0) (ST509: YES), in ST510, output 204 outputs a positioning solution of the RTK calculation as a fixed solution, that is, a precise positioning solution. This precise positioning solution represents current coordinates of a moving body in which positioning terminal 20 is installed.

In a case where the AR value is less than the threshold (ST509: NO), on the other hand, in ST511, output 204 outputs a positioning solution of the RTK calculation as a float solution, that is, an estimated solution.

<Effect>

As described above, in Embodiment 1, the value of the shielding SNR mask is set to be higher as the elevation angle becomes lower, and a satellite for which the SNR is less than the shielding SNR mask is selected as an exclusion target. Thus, it is possible to execute an RTK calculation by surely excluding a multipath satellite with a low elevation angle, and it is therefore possible to improve positioning accuracy. Note that, although in this case there is an increased possibility that even a non-multipath satellite with a low elevation angle will be excluded, it is possible to suppress degradation of accuracy of RTK calculation if a certain number of satellites with a high elevation angle (for example, an elevation angles greater than 25°) can be secured. Accordingly, an effect of improvement in accuracy attainable by excluding a multipath satellite is greater in comparison with degradation of accuracy due to excluding a non-multipath satellite.

Embodiment 2

In a case where a shielding object around positioning terminal 20 also affects a signal from a satellite with a medium elevation angle (for example, an elevation angle of 25° or more and 45° or less), positioning accuracy can be more improved, as described in Embodiment 1, when a multipath satellite is surely excluded by excluding a satellite with a low elevation angle other than a satellite with a low elevation angle for which the SNR is extremely high.

In a case where a shielding object around positioning terminal 20 affects only a signal from a satellite with a low elevation angle, on the other hand, positioning accuracy may be more improved by keeping a satellite other than a satellite for which the SNR is extremely low and using the remaining satellite for an RTK calculation. For example, in a case where there is only an extremely low shielding object around positioning terminal 20, positioning terminal 20 is highly likely capable of receiving a direct wave from a satellite with a low elevation angle as well. However, as described above, the SNR of a signal from a satellite with a low elevation angle tends to be low regardless of a direct wave or not. Accordingly, when the threshold of the SNR used for selecting a satellite to be excluded is set to be too high, a direct wave from a satellite with a low elevation angle cannot be used for an RTK calculation. In such a case, positioning accuracy can be more improved by loosening criteria for selecting a satellite to be excluded, keeping a satellite other than a satellite for which the SNR is extremely low, and using the remaining satellite for an RTK calculation.

Embodiment 2 focuses on the point described above. Note that, since the configurations of positioning system 1, reference station 10 and positioning terminal 20 in Embodiment 2 are the same as the contents thereof described in Embodiment 1, descriptions thereof will be omitted. In Embodiment 2, however, storage 202 of positioning terminal 20 stores, in addition to a shielding SNR mask (first threshold), a switching threshold, and a normal SNR mask (second threshold).

<Switching Threshold>

Figure 6:
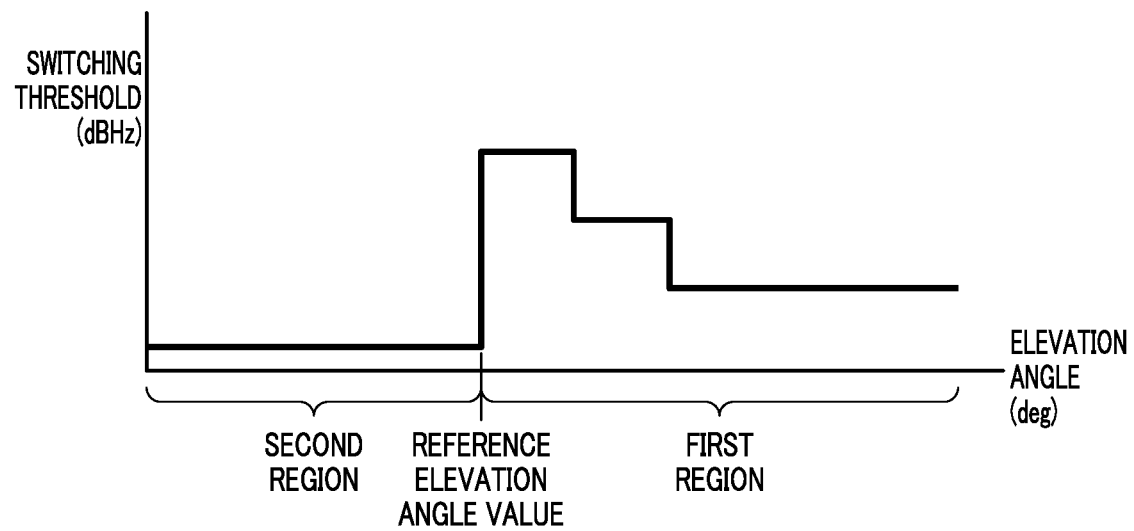
FIG. 6 is a diagram describing a switching threshold according to Embodiment 2 of the present disclosure.

Next, the switching threshold will be described with reference to FIG. 6. Note that, the horizontal axis of FIG. 6 represents the elevation angle (unit: degree), and the vertical axis of FIG. 6 represents the value of the switching threshold (unit: dBHz).

In a first region where the elevation angle is at least a reference elevation angle value, the value of the switching threshold is set to be higher as the elevation angle becomes lower. In a second region where the elevation angle is less than the reference elevation angle value, the value of the switching threshold is set to be a constant value. The reference elevation angle value is set in advance by a user.

Note that, the value of the switching threshold in the first region may change stepwise or continuously. That is, as illustrated in FIG. 6, it may be configured such that the value of the switching threshold is constant in a predetermined elevation angle range and the switching threshold becomes discontinuously higher when the elevation angle is lower than the elevation angle range, or it may be configured such that the value of the switching threshold becomes continuously higher in a straight or curved shape as the elevation angle becomes lower. That is, the first region of the switching threshold may be configured such that at any elevation angle, a value of the switching threshold corresponding to a low elevation angle does not exceed a value of the switching threshold corresponding to a high elevation angle. In the present specification, these states are comprehensively expressed as "the value of the switching threshold becomes higher as the elevation angle becomes lower".

Further, the value of the switching threshold in the second region is set to be lower than the value of the normal SNR mask.

By setting the switching threshold as described above, it is possible to cause switching to the shielding SNR mask to hardly occur in a case where the switching to the shielding SNR mask does not occur until a medium-sized elevation angle (for example, 30°). Thus, it is possible to reduce the possibility that a signal from a satellite with a low elevation angle will be excessively excluded. Further, since the value of the switching threshold in the second region is set to be much lower than the normal SNR mask, positioning terminal 20 is capable of determining, even in a case where the switching to the shielding SNR mask does not occur until a medium-sized elevation angle, whether a satellite is to be excluded or not with strict criteria for the shielding SNR mask in a case where the SNR is extremely low.

<Normal SNR Mask>

Next, the normal SNR mask will be described with reference to FIG. 7. Note that, the horizontal axis of FIG. 7 represents the elevation angle (unit: degree), and the vertical axis of FIG. 7 represents the value of the normal SNR mask (unit: dBHz).

Figure 7:
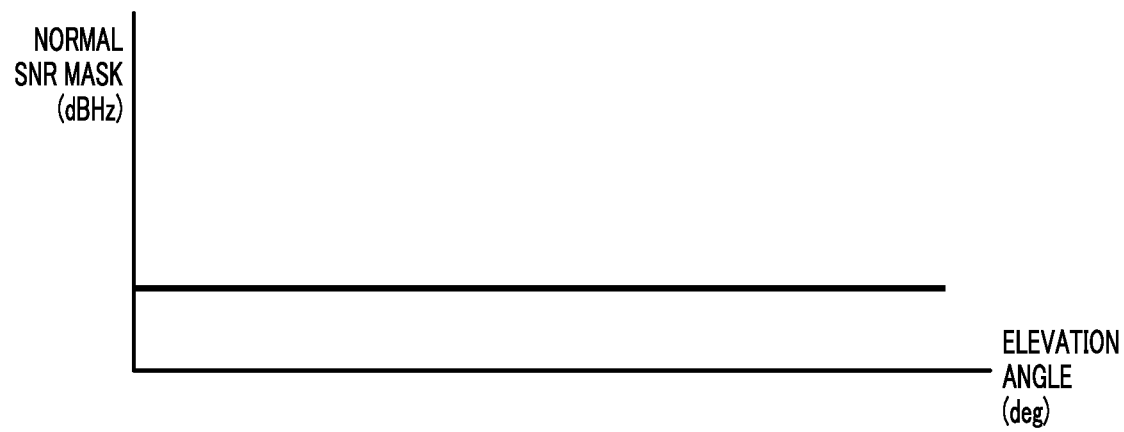
FIG. 7 is a diagram describing a normal SNR mask according to Embodiment 2 of the present disclosure.

As illustrated in FIG. 7, the normal SNR mask is set such that the value of the normal SNR mask becomes a constant value without depending on the elevation angle. Note that, the normal SNR mask may also be set such that the value of the normal SNR mask becomes continuously higher in a straight or curved shape as the elevation angle becomes higher. Here, the expression "the normal SNR mask is set such that the value thereof becomes higher as the elevation angle becomes higher" includes all of a case where the value become higher stepwise, a case where the value becomes continuously higher, and a case where the value becomes higher as a whole even when the value becomes lower at some elevation angles. Note that, the normal SNR mask whose value becomes higher as the elevation angle becomes higher has a feature that at each elevation angle, a satellite that is less affected by a multipath at the elevation angle can be selected and used for an RTK calculation. Generally, since a signal from a satellite with a higher elevation angle has a higher SNR, a signal from a satellite with a higher elevation angle has a higher average SNR. Accordingly, by using the normal SNR mask whose value becomes higher as the elevation angle becomes higher, it is possible to select a satellite with a high SNR in light of the level at each elevation angle. This makes it easier to use signals from satellites with a variety of elevation angles for an RTK calculation, so that even when atmospheric turbulence or the like occurs at some elevation angles, an influence thereof can be suppressed.

<Flow of Positioning Processing>

Figure 8:
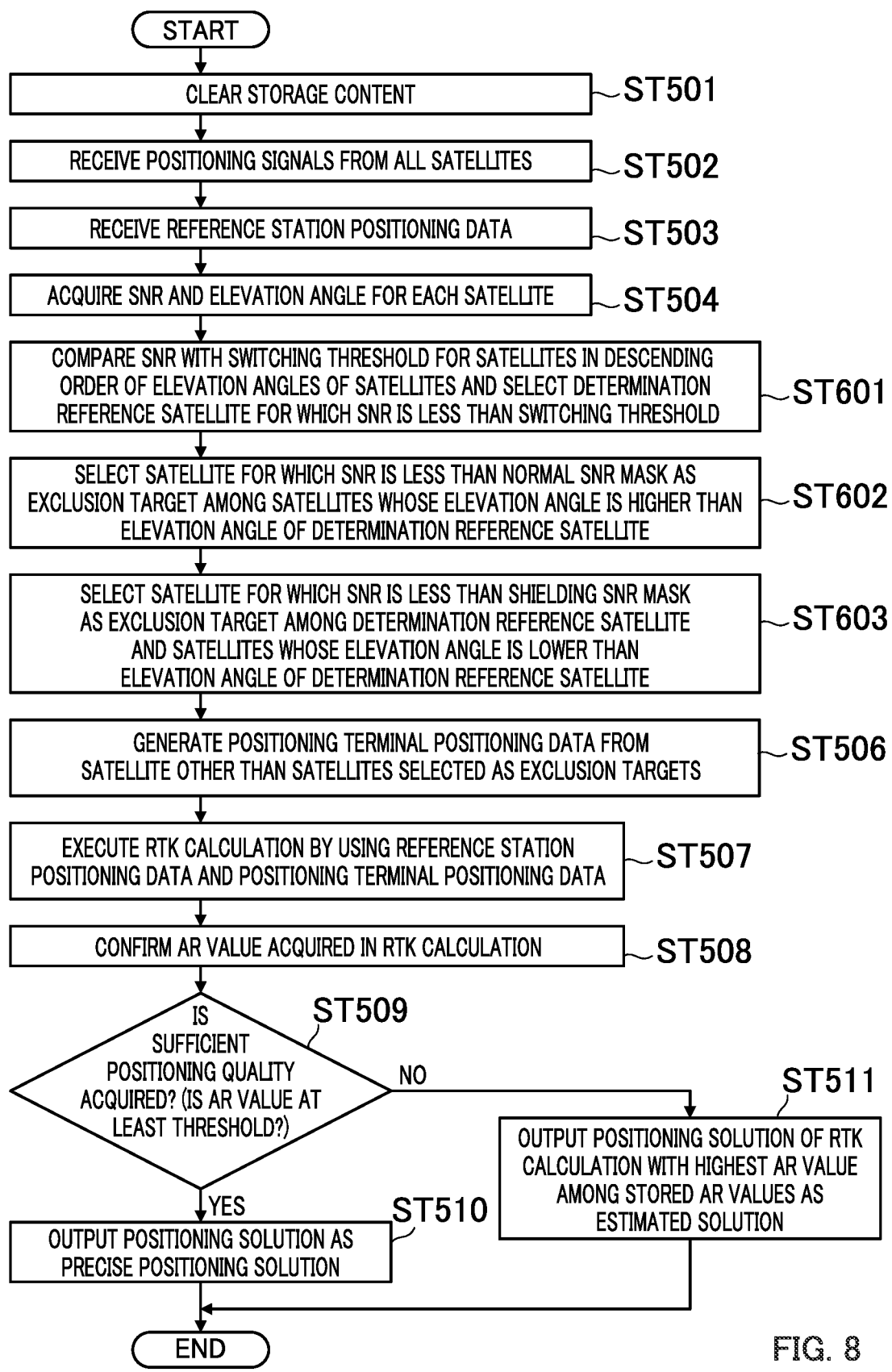
FIG. 8 is a flowchart illustrating positioning processing according to Embodiment 2 of the present disclosure.

Next, a flow of positioning processing according to Embodiment 2 will be described with reference to FIG. 8. Note that, in the flow illustrated in FIG. 8, the steps common to those in the flow illustrated in FIG. 5 are denoted by the same reference numerals as in FIG. 5 and detailed descriptions thereof will be omitted. As compared to the flow illustrated in FIG. 5, ST505 is deleted and ST601, ST602 and ST603 are added instead in the flow illustrated in FIG. 8.

After ST504, in ST601, processor 201 compares the SNR with a switching threshold for the satellites in descending order of the elevation angles of the satellites, and selects a satellite for which the SNR is less than the switching threshold (hereinafter, the satellite will be referred to as "determination reference satellite").

Next, in ST602, processor 201 determines a satellite for which the SNR is less than a normal SNR mask as a multipath satellite among satellites whose elevation angle is higher than an elevation angle of the determination reference satellite, and selects the satellite as an exclusion target.

Further, in ST603, processor 201 determines a satellite for which the SNR is less than a shielding SNR mask as a multipath satellite among the determination reference satellite and satellites whose elevation angle is lower than the elevation angle of the determination reference satellite, and selects the satellite as the exclusion target. The flow then proceeds to ST506.

<Effect>

As described above, in Embodiment 2, the SNR is compared with a switching threshold for satellites in descending order of the elevation angles of the satellites, and a determination reference satellite for which the SNR is less than the switching threshold is selected. Then, a satellite for which the SNR is less than a normal SNR mask among satellites whose elevation angle is higher than an elevation angle of the determination reference satellite, and a satellite for which the SNR is less than a shielding SNR mask among the determination reference satellite and satellites whose elevation angle is lower than the elevation angle of the determination reference satellite are selected as exclusion targets. Since the existence of a determination reference satellite means that a satellite for which the value of the SNR is low is found, the value of the SNR is highly likely difficult to predict at an elevation angle lower than the elevation angle of the determination reference satellite. Accordingly, Embodiment 2 is configured such that by subjecting satellites whose elevation angle is lower than an elevation angle of a determination reference satellite to satellite selection based on a shielding SNR mask, a satellite for which the value of the SNR becomes high even though the satellite is in an environment where a multipath easily occurs can also be excluded.

Note that, in a case where no determination reference satellite exists, satellite selection based on a shielding SNR mask is not performed and only satellite selection based on a normal SNR mask is performed. In this case, since the SNR is stably high even for a signal from a satellite with a low elevation angle, it is highly likely that no multipath satellite exists and an effect of improvement in accuracy attainable by utilizing a satellite with a low elevation angle is greater in comparison with degradation of accuracy due to remaining of a multipath satellite.

Accordingly, Embodiment 2 makes it possible to further improve positioning accuracy.

<Variation 1>

Figure 9:
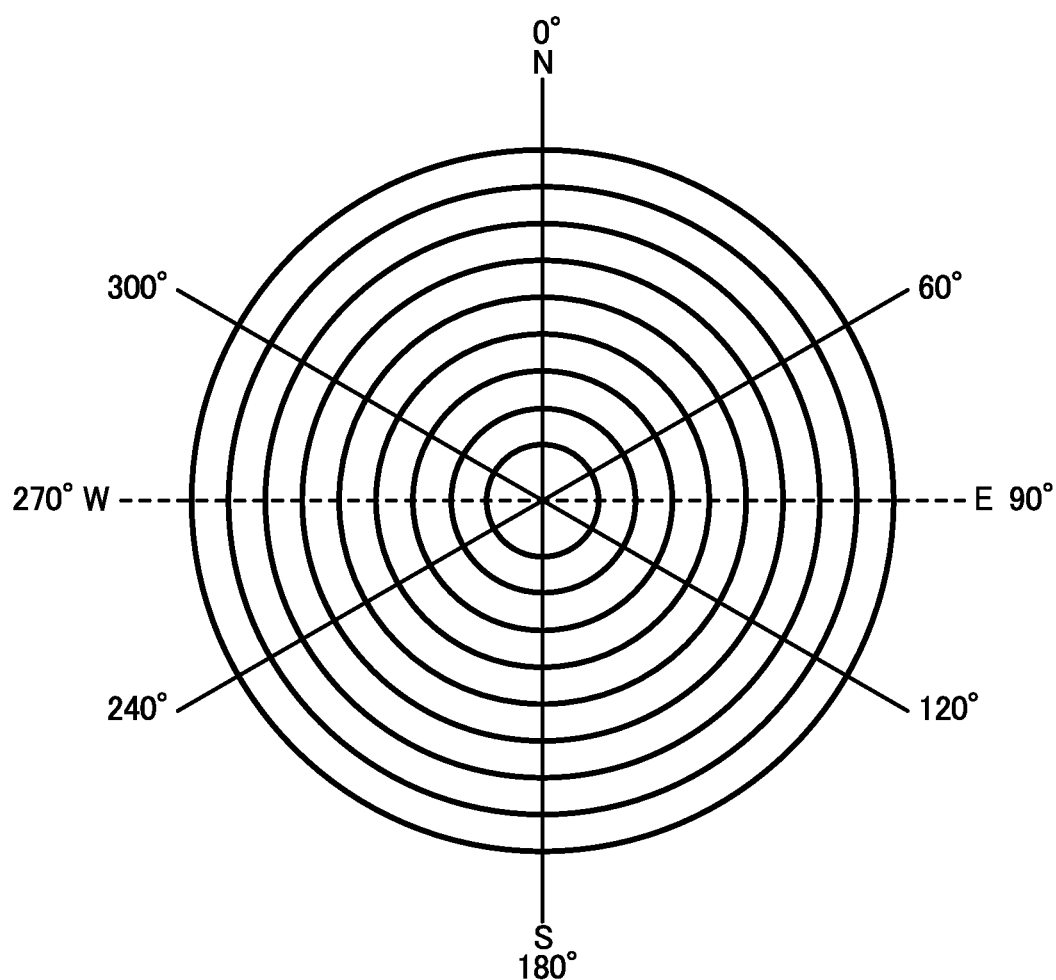
FIG. 9 is a diagram illustrating an example of division of a spatial region according to Variation 1 of Embodiment 2 of the present disclosure.

Embodiment 2 may also be configured such that a spatial region is divided into a plurality of spatial regions with bearings to perform the processing of ST601 to ST603 for each of the divided spatial regions (hereinafter, referred to as "divided region"). For example, as illustrated in FIG. 9, a spatial region may be divided with bearings 0° (N direction), 60°, 120°, 180°, 240°, and 300° to perform the processing of ST601 to ST603 for each of six divided regions.

Note that, the spatial region in this case refers to a three-dimensional space in which the azimuth ranges from 0° to 360° and the elevation angle ranges from 0° to 90° around positioning terminal 20.

Thus, it is possible to confirm whether or not a determination reference satellite exists for each bearing and to change an elevation angle to which a shielding SNR mask is applied. In a case where a shielding object exists only in a specific bearing or has a different height depending on the bearing, the likelihood that a multipath is generated varies depending on the bearing. Accordingly, for a bearing in which no shielding object exists or only a low shielding object exists, it is possible to lower an elevation angle for which severe selection based on a shielding SNR mask is performed, by selecting a determination reference satellite for each bearing and setting for each bearing an elevation angle to which a shielding SNR mask is applied. Thus, even a signal from a satellite with a low elevation angle can be reflected in an RTK calculation for a bearing in which a multipath satellite is unlikely to exist, and therefore positioning accuracy can be further improved in a case where a shielding object exists only in a specific bearing.

<Variation 2>

Figure 10:
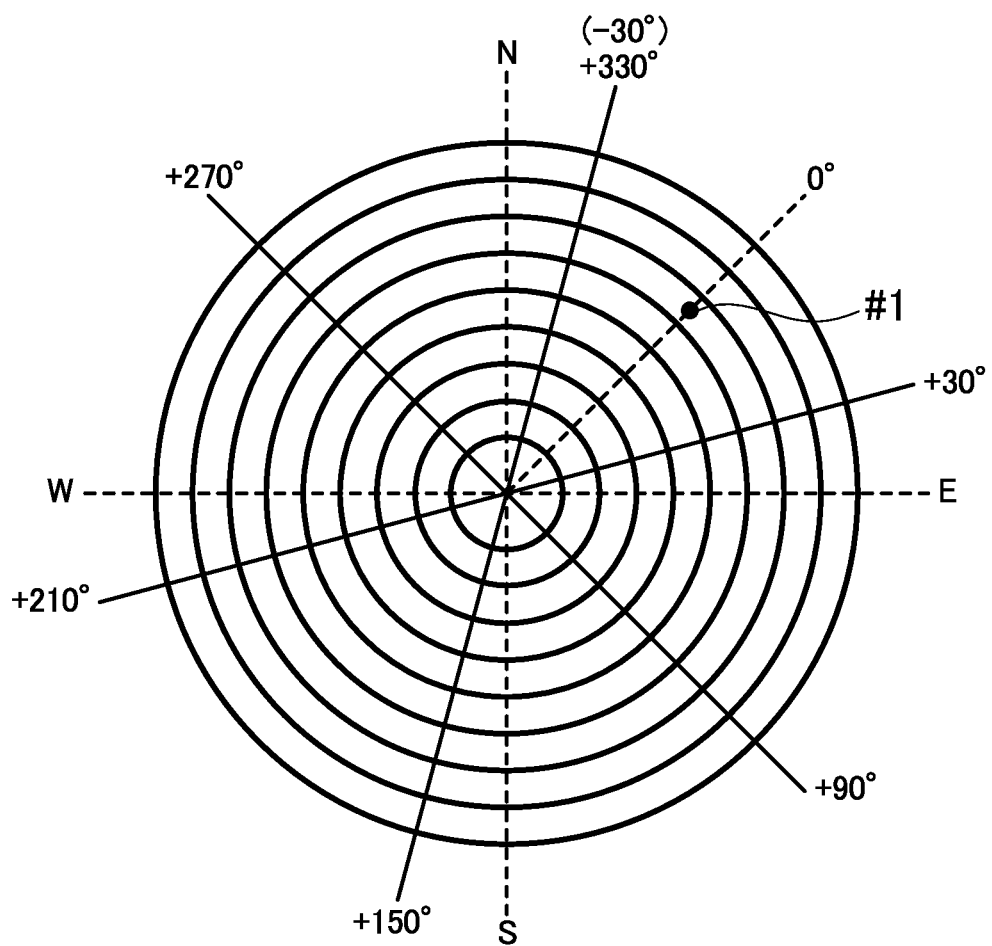
FIG. 10 is a diagram illustrating an example of division of a spatial region according to Variation 2 of Embodiment 2 of the present disclosure.

Further, Embodiment 2 may also be configured such that a spatial region is divided by using a bearing of a determination reference satellite as a reference (center). For example, as illustrated in FIG. 10, in a case where a spatial region is divided into six spatial regions, the spatial region is divided with respective bearings +30°, +90°, +150°, +210°, +270°, and +330° (=−30°) from a bearing of determination reference satellite #1. In this case, the divided region including the determination reference satellite is a region delimited by the bearings +30° and −30° from the bearing of the determination reference satellite.

In Variation 1, the spatial region is divided by using the bearings north, east, south, and west as a reference. In an actual environment, however, mountains and high-rise buildings, which could be shielding objects, are unlikely arranged along bearings, and further shielding objects are unlikely to exist only in an extremely narrow range. Accordingly, by dividing a spatial region by using as a reference a bearing in which a firstly found determination reference satellite (that is, a satellite with the highest elevation angle which is however below a switching threshold) exists, it is possible to evaluate whether a shielding SNR mask should be applied with distinguishing between a range including the highest shielding object and other ranges. Thus, it is possible to effectively perform bearing division and further improve positioning accuracy.

<Variation 3>

Figure 11:
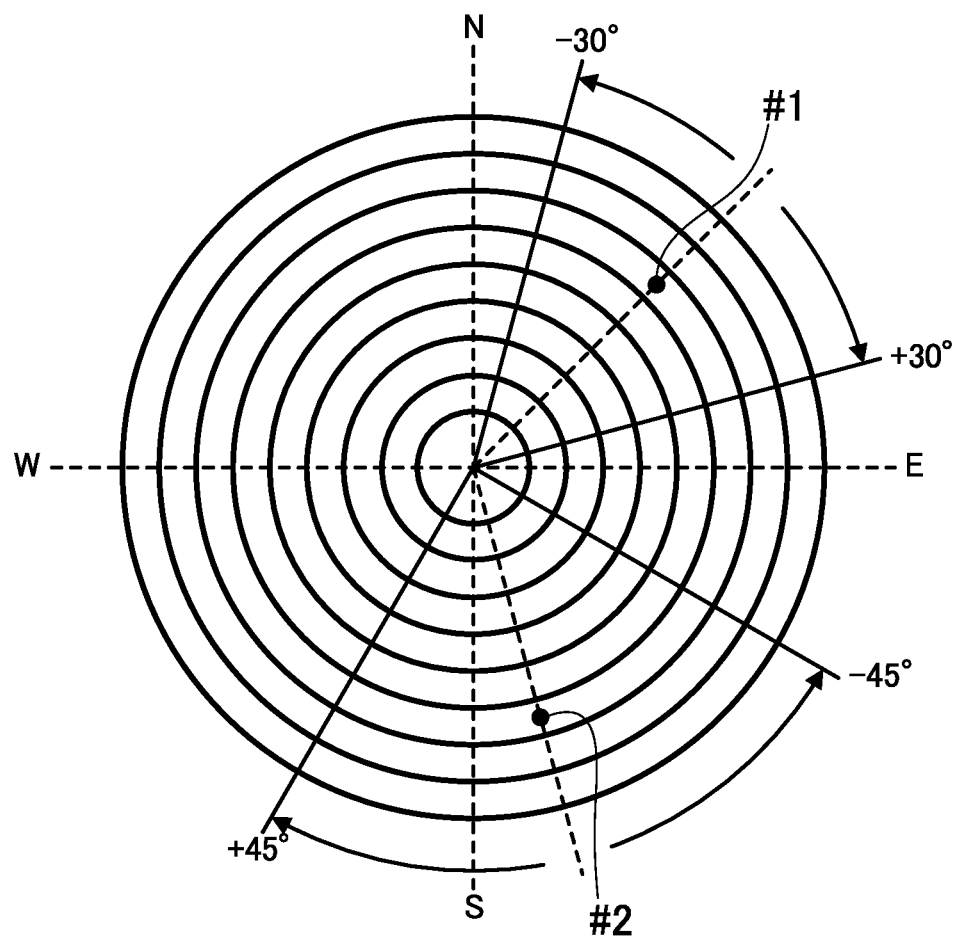
FIG. 11 is a diagram illustrating an example of division of a spatial region according to Variation 3 of Embodiment 2 of the present disclosure.

Further, Embodiment 2 may also be configured such that a divided region including a determination reference satellite is set to be wider as an elevation angle of the determination reference satellite becomes lower. For example, as illustrated in FIG. 11, in a case where an elevation angle of determination reference satellite #1 is 60°, a region delimited by bearings +30° and −30° from a bearing of determination reference satellite #1 is defined as a divided region including determination reference satellite #1, and in a case where an elevation angle of determination reference satellite #2 is 30°, a region delimited by bearings +45° and −45° from a bearing of determination reference satellite #2 is defined as a divided region including determination reference satellite #2. Note that, the expression "the divided region including the determination reference satellite is set to be wider as the elevation angle of the determination reference satellite becomes lower" includes all of a case in which the divided region spreads stepwise, a case where the divided region spreads continuously, and a case in which the divided region spreads as a whole even when the divided region is narrowed at some elevation angles.

In an actual environment, the lower the height of an elevation angle of a determination reference satellite is, the more likely buildings and/or the like which become shielding objects exist. Accordingly, since it is conceivable that the lower an elevation angle of a determination reference satellite is, the more likely shielding objects exist with a wide angle in a bearing of the determination reference satellite, it is possible to effectively perform bearing division and further improve positioning accuracy by setting a divided region including the determination reference satellite to be wider as the elevation angle of the determination reference satellite becomes lower.

Note that, the determination reference satellite serving as a reference for bearing division may be a determination reference satellite that is firstly found when evaluation is performed for satellites in descending order of the elevation angles of the satellites. Further, a plurality of determination reference satellites may be extracted to determine ranges of division so as to surround the respective determination reference satellites.

In the former case, the positioning terminal determines, at a point of time when a determination reference satellite is firstly found, ranges of divided regions for every bearing in accordance with an elevation angle of the determination reference satellite.

In the latter case, the positioning terminal divides, at a point of time when a determination reference satellite is firstly found, a spatial region into a range surrounding the determination reference satellite and a range for every bearing other than the range surrounding the determination reference satellite. For example, in a case where determination reference satellite #1 with an elevation angle of 60° is found in the example described above, a spatial region is divided into a range delimited by bearings +30° and −30° from determination reference satellite #1 and the other range of 300°. Subsequently, a determination reference satellite is further searched for in the other range (the range of 300° in the specific example described above). In a case where a determination reference satellite is found, the range of 300° is divided into a range surrounding the determination reference satellite and a range for the other bearings. For example, in a case where determination reference satellite #2 with an elevation angle of 30° is found, the range of 300° is divided into a range delimited by bearings +45° and −45° from the determination reference satellite and the remaining range of 210°. By repeating such processing until the elevation angle becomes 0°, it is possible to set divided regions in ranges in accordance with a determination reference satellite in each bearing. Note that, a region in which divided regions overlap with each other among a plurality of determination reference satellites is basically processed as belonging to a divided region corresponding to a determination reference satellite with a higher elevation angle. This is because that in a case where a determination reference satellite is found at a high elevation angle, a bearing around the determination reference satellite is already highly likely affected by a multipath without evaluating a low elevation angle. However, it may be configured, conversely, such that a region in which divided regions overlap with each other among a plurality of determination reference satellites belongs to a divided region corresponding to a determination reference satellite with a low elevation angle. As an example in which such a reference is useful, it is possible to consider e.g. a case where there are too few satellites available when a region in which divided regions overlap with each other among a plurality of determination reference satellites is evaluated as belonging to a divided region of a determination reference satellite with a high elevation angle. Further, in a case where a plurality of determination reference satellites is evaluated as in the latter case, divided regions may have an angle with a fixed width (every 60 degrees in Variation 2) regardless of the elevation angle as in Variation 2.

<Variation 4>

Further, Embodiment 2 may also be configured such that a spatial region is divided in each of a plurality of division patterns, a positioning calculation is performed in parallel for each division pattern, and a positioning solution acquired by a best positioning calculation is output. As an example of the plurality of division patterns, it is conceivable, for example, to change angles of division. Further, as another example, the procedure for division may be changed. For example, it is conceivable that any of Variations 1 to 3 described above is used.

Since a situation of a shielding object varies depending on each positioning point, it is conceivable that an optimum division pattern also changes depending on each positioning point. Accordingly, it is possible to further improve positioning accuracy by performing a positioning calculation in parallel for each division pattern and outputting a positioning solution acquired by a best positioning calculation.

<Variation 5>

Further, Embodiment 2 may also be configured such that a division pattern of a best positioning calculation among a plurality of division patterns is stored in association with a positioning point and a spatial region is divided in the division pattern corresponding to the positioning point.

Thus, it is possible to improve positioning accuracy while reducing a calculation load.

It should be noted that the present disclosure is not limited to the embodiments described above in terms of e.g. the type, arrangement, number of members, and alterations can be made as appropriate without departing from the scope of the present invention by, for example, appropriately substituting the components with those having equivalent operational effects.

Various embodiments have been described above with reference to the drawings. However, it goes without saying that the present disclosure is not limited to these embodiments. It is obvious that one of ordinary skill in the art can conceive various modified examples and correction examples within the scope recited in the claims. It should be naturally understood that these modified examples and correction examples belong to the technical scope of the present disclosure. Furthermore, each component of the above embodiment may be optionally combined without departing from the gist of the disclosure.

In each of the embodiments described above, the present disclosure has been described with examples in which hardware is used to configure the present disclosure. However, the present disclosure can be realized by software, hardware, or software in cooperation with hardware.

Each functional block used in the description of the embodiments described above is typically realized by an LSI such as an integrated circuit. The integrated circuit may control each functional block used for describing the embodiments described above, and may include a data input and output coupled thereto. The LSI may be individually formed as chips, or one chip may be formed so as to include a part or all of each functional block. The LSI here may be referred to as an IC, a system LSI, a super LSI, or an ultra LSI depending on the difference in degree of integration.

However, the technique of implementing an integrated circuit is not limited to the LSI and may be realized by using a dedicated circuit or a general-purpose processor. A field programmable gate array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

It should be noted that the present disclosure can be represented as a control method performed in a radio communication apparatus or a control apparatus. Further, the present disclosure can also be represented as a program for causing the control method to be operated with a computer. In addition, the present disclosure can be also represented as a recording medium where the program is recorded so as to be readable by a computer. That is, the present disclosure may be represented in any category of devices, methods, programs, and recording media.

It should also be noted that the present disclosure is not limited to the embodiments described above in terms of e.g. the type, arrangement, number of members, and alterations can be made as appropriate without departing from the scope of the present invention by, for example, appropriately substituting the components with those having equivalent operational effects.

The disclosure of Japanese Patent Application No. 2018-114775, filed on Jun. 15, 2018, including the specification, drawings and abstract, is incorporated herein by reference in its entirety.

INDUSTRIAL APPLICABILITY

The present disclosure is suitable for use in a case where interference positioning is performed by using a signal from a satellite.

REFERENCE SIGNS LIST

1 Positioning system
10 Reference station
20 Positioning terminal
101, 201 Processor
102, 202 Storage
103, 203 Input
104, 204 Output
105, 205 Communicator
106, 206 Receiver
110, 210 Bus

The invention claimed is:

1. A positioning method of determining coordinates of a moving body by performing a positioning calculation by a positioning terminal based on information transmitted from a plurality of satellites, the positioning method comprising:
calculating, by the positioning terminal, an elevation angle of each of the plurality of satellites;
measuring, by the positioning terminal, a received strength of a signal transmitted from each of the plurality of satellites;
comparing, by the positioning terminal, the received strength with a first threshold for each of the plurality of satellites, the first threshold increasing as the elevation angle becomes lower;
comparing, by the positioning terminal, the received strength with a switching threshold for the plurality of satellites in descending order of the elevation angle of each of the plurality of satellites;
determining a determination reference satellite for which the received strength is less than the switching threshold;
performing a first comparison by comparing, by the positioning terminal, the received strength with the first threshold for the determination reference satellite and every satellite of which the elevation angle is lower than the elevation angle of the determination reference satellite;
performing a second comparison by comparing, by the positioning terminal, the received strength with a second threshold for every satellite of which the elevation angle is higher than the elevation angle of the determination reference satellite;
selecting, by the positioning terminal, a first satellite for which the received strength is less than the first threshold in the first comparison or less than the second threshold in the second comparison, as an exclusion target; and
performing, by the positioning terminal, the positioning calculation based on information transmitted from a second satellite other than the first satellite selected as the exclusion target.

2. The positioning method according to claim 1, comprising:
dividing, by the positioning terminal, a spatial region into a plurality of spatial regions with predetermined bearings; and
selecting, by the positioning terminal, the first satellite that is the exclusion target, for each of the divided spatial regions.

3. The positioning method according to claim 2, comprising:
dividing, by the positioning terminal, the spatial region by using a bearing of the determination reference satellite as a reference.

4. The positioning method according to claim 2, comprising:
setting, by the positioning terminal, a spatial region including the determination reference satellite to be wider as the elevation angle of the determination reference satellite becomes lower.

5. The positioning method according to claim 2, comprising:
dividing, by the positioning terminal, the spatial region in each of a plurality of division patterns;
performing, by the positioning terminal, the positioning calculation in parallel for each of the division patterns; and
outputting, by the positioning terminal, a positioning solution acquired by a best positioning calculation.

6. The positioning method according to claim 5, comprising:
storing, by the positioning terminal, a division pattern of the best positioning calculation in association with a positioning point; and
dividing, by the positioning terminal, the spatial region in the division pattern corresponding to the positioning point.

7. The positioning method according to claim 1, wherein the second threshold becomes higher as the elevation angle increases.

8. A positioning terminal, comprising:
a receiver that receives positioning signals transmitted from a plurality of satellites; and
a processor that determines coordinates of a moving body by performing a positioning calculation based on information included in the positioning signals, wherein the processor:
calculates an elevation angle of each of the plurality of satellites;
measures a received strength of a signal transmitted from each of the plurality of satellites;
compares the received strength with a first threshold for each of the plurality of satellites, the first threshold increasing as the elevation angle becomes lower;
compares the received strength with a switching threshold for the plurality of satellites in descending order of the elevation angle of each of the plurality of satellites;
determines a determination reference satellite for which the received strength is less than the switching threshold;
performs a first comparison that compares the received strength with the first threshold for the determination reference satellite and every satellite of which the elevation angle is lower than the elevation angle of the determination reference satellite;
performs a second comparison that compares the received strength with a second threshold for every satellite of which the elevation angle is higher than the elevation angle of the determination reference satellite;
selects a first satellite for which the received strength is less than the first threshold in the first comparison or less than the second threshold in the second comparison, as an exclusion target; and
performs the positioning calculation based on information transmitted from a second satellite other than the first satellite selected as the exclusion target.

9. The positioning terminal according to claim 8, wherein the processor
divides a spatial region into a plurality of spatial regions with predetermined bearings; and
selects the first satellite that is the exclusion target for each of the divided spatial regions.

10. The positioning terminal according to claim 9, wherein
the processor divides the spatial region by using a bearing of the determination reference satellite as a reference.

11. The positioning terminal according to claim 9, wherein
the processor sets a spatial region including the determination reference satellite to be wider as the elevation angle of the determination reference satellite becomes lower.

12. The positioning terminal according to claim 9, wherein the processor
divides the spatial region in each of a plurality of division patterns;
performs the positioning calculation in parallel for each of the division patterns; and
outputs a positioning solution acquired by a best positioning calculation.

13. The positioning terminal according to claim 12, wherein the processor
stores a division pattern of the best positioning calculation in association with a positioning point; and
divides the spatial region in the division pattern corresponding to the positioning point.

14. The positioning terminal according to claim 8, wherein
the second threshold becomes higher as the elevation angle increases.

* * * * *